(12) United States Patent
Hayek et al.

(10) Patent No.: US 8,663,729 B2
(45) Date of Patent: *Mar. 4, 2014

(54) PET FOOD COMPOSITIONS

(75) Inventors: Michael Griffin Hayek, Dayton, OH (US); Stefan Patrick Massimino, Kettering, OH (US); George Roth, Pylesville, MD (US)

(73) Assignee: The Iams Company, Cincinnati, OH (US)

( * ) Notice: Subject to any disclaimer, the term of this patent is extended or adjusted under 35 U.S.C. 154(b) by 233 days.

This patent is subject to a terminal disclaimer.

(21) Appl. No.: 12/716,533

(22) Filed: Mar. 3, 2010

(65) Prior Publication Data

US 2010/0159103 A1    Jun. 24, 2010

Related U.S. Application Data

(63) Continuation of application No. 12/638,101, filed on Dec. 15, 2009, which is a continuation of application No. 10/842,301, filed on May 10, 2004, now Pat. No. 7,666,459, which is a continuation-in-part of application No. 09/950,052, filed on Sep. 12, 2001, now abandoned.

(51) Int. Cl.
    *A23K 1/14*    (2006.01)

(52) U.S. Cl.
    USPC .......... 426/635; 426/655; 426/656; 426/657; 426/658; 426/805

(58) Field of Classification Search
    USPC ............... 426/635, 656, 655, 657, 658, 805
    See application file for complete search history.

(56) References Cited

U.S. PATENT DOCUMENTS

| | | | |
|---|---|---|---|
| 2,641,548 A | 6/1953 | Heinrich | |
| 3,398,001 A | 8/1968 | Benson | |
| 3,677,808 A | 7/1972 | Mitsugi et al. | |
| 3,989,822 A * | 11/1976 | Whistler | 514/23 |
| 4,647,453 A * | 3/1987 | Meisner | 424/54 |
| 4,808,626 A | 2/1989 | Friedman et al. | |
| 4,814,193 A | 3/1989 | Shenouda et al. | |
| 4,937,077 A * | 6/1990 | Deetz, III | 424/442 |
| 5,344,824 A | 9/1994 | Ohkuma et al. | |
| 5,389,779 A | 2/1995 | Betzig et al. | |
| 5,824,779 A | 10/1998 | Koegel et al. | |
| 5,854,067 A | 12/1998 | Newgard et al. | |
| 5,871,794 A | 2/1999 | Brito | |
| 5,871,802 A * | 2/1999 | Gao et al. | 426/635 |
| 5,939,117 A | 8/1999 | Chen et al. | |
| 6,358,555 B1 | 3/2002 | Takahashi | |
| 6,406,853 B1 | 6/2002 | Spindler | |
| 6,586,027 B2 | 7/2003 | Axelrod et al. | |
| 6,737,089 B2 | 5/2004 | Wadsworth et al. | |
| 6,896,914 B2 | 5/2005 | Chapnick et al. | |
| 6,932,990 B2 | 8/2005 | Konishi et al. | |
| 6,979,675 B2 | 12/2005 | Tidmarsh | |
| 7,097,831 B1 | 8/2006 | Bengs et al. | |
| RE39,436 E | 12/2006 | Spindler et al. | |
| 2002/0035071 A1 | 3/2002 | Pitha et al. | |
| 2003/0092669 A1 | 5/2003 | Chapnick et al. | |
| 2003/0104090 A1 | 6/2003 | Levy et al. | |
| 2003/0157166 A1 | 8/2003 | Chen et al. | |
| 2004/0001875 A1 | 1/2004 | Sunvold et al. | |
| 2004/0047896 A1 | 3/2004 | Malnoe et al. | |
| 2004/0167229 A1 | 8/2004 | Bakker-Arkema et al. | |
| 2004/0228933 A1 | 11/2004 | Chapnick et al. | |
| 2005/0013849 A1 | 1/2005 | Lemaure et al. | |
| 2005/0074519 A1 | 4/2005 | Bartnick et al. | |
| 2005/0079244 A1 * | 4/2005 | Giffard et al. | 426/42 |
| 2005/0096256 A1 | 5/2005 | Sinclair et al. | |
| 2005/0100617 A1 | 5/2005 | Malnoe et al. | |
| 2005/0112259 A1 | 5/2005 | Qyvjt | |
| 2005/0164978 A1 | 7/2005 | Chapnick et al. | |
| 2005/0208163 A1 | 9/2005 | Brovelli et al. | |
| 2005/0249837 A1 | 11/2005 | Massimino et al. | |
| 2005/0249841 A1 | 11/2005 | Hayek et al. | |
| 2005/0266438 A1 | 12/2005 | Spindler et al. | |
| 2006/0100162 A1 | 5/2006 | Pitha et al. | |
| 2007/0149466 A1 | 6/2007 | Milburn et al. | |
| 2007/0220619 A1 | 9/2007 | Zhao-Wilson | |

(Continued)

FOREIGN PATENT DOCUMENTS

DE    3715070 A1    11/1988
DE    4018392 A1    12/1991

(Continued)

OTHER PUBLICATIONS

Barrows, F.T. and W.A. Lellis. 1996. Diet and nutrirtion. pp. 315-321 in R.C. Summerfelt, editor. Walleye culture manual. NCRAC Culture Series 101. North Central Regional Aquaculture Center Publications Office, Iowa State University, Ames.*

Alves-Filho, Drying Technology, 2002. vol. 20, No. 8, pp. 1541-1557, abstract.*

Sener et al. "Environmental Modulation of D-fructose Insulinotropic Action" Acta Diabetol (1998) 35: pp. 74-76.

Zhang et al. "Dissimilar effect of D-mannoheptulose on the phophorylation of A-versus D glucose by either hexokinase or glucokinase" International Journal of Molecular Medicine 14: pp. 107-112, 2004.

Pelicano et al. "Glycosis Inhibition for Anticancer Treatment", *Oncogene* (2006) 25, 4633-4646.

(Continued)

*Primary Examiner* — Chhaya Sayala
(74) *Attorney, Agent, or Firm* — Amy M. Foust

(57) ABSTRACT

Disclosed herein are pet food compositions. In one embodiment, pet food compositions which are described comprise a component selected from 2-deoxy-D-glucose; 5-thio-D-glucose; 3-O-methylglucose; 1,5-anhydro-D-glucitol; 2,5-anhydro-D-mannitol; mannoheptulose; and mixtures thereof. In yet another embodiment, pet food compositions which are described comprise an extract of plant matter selected from avocado, alfalfa, fig, primrose, and mixtures thereof. The pet food compositions may be prepared by any of a variety of processes including, but not limited to, optional processes described herein.

23 Claims, No Drawings

(56) References Cited

U.S. PATENT DOCUMENTS

| | | | |
|---|---|---|---|
| 2008/0113921 | A1 | 5/2008 | Piccirilli et al. |
| 2008/0176935 | A1 | 7/2008 | Henderson et al. |
| 2008/0194476 | A1 | 8/2008 | Piccirilli et al. |
| 2008/0214479 | A1 | 9/2008 | Pitha et al. |

FOREIGN PATENT DOCUMENTS

| | | |
|---|---|---|
| EP | 1 637 641 B1 | 4/2008 |
| WO | WO 95/03809 | 2/1995 |
| WO | WO 2005/115421 A1 | 12/1995 |
| WO | WO 99/51108 | 10/1999 |
| WO | WO 03007732 A2 | 1/2003 |
| WO | WO 2004/100670 A1 | 11/2004 |
| WO | WO 2007/009111 A1 | 1/2007 |
| WO | WO 2007/057439 A1 | 5/2007 |
| WO | WO 2007/137808 A1 | 12/2007 |

OTHER PUBLICATIONS

Frech et al. "The Utility of Nutraceuticals in the Treatment of Osteoarthritis" Current Rheumatology Reports 2007, 9: 25-30.
Conde et al. "OeMST2 Encodes a Monosaccharide Transporter Expressed Throughout Olive Fruit Maturation" *Plant Cell Physical* 48(9): 1299-1308 (2007).
Wamelink et al. "Detection of Transaldolase Deficiency by Quantification of Novel Seven-Carbon Chain Carbohydrate Biomarkers in Urine" J Inherit Metab Dis (2007) 30: 735-742.
Peter T. Katzmarzyk "The Metabolic Syndrome: An Introduction" Appl. Physiol. Nurt. Metab. 32: 1-3 (2007).
Katie Barge "Avocados May Help Prevent Oral Cancer" *Journal of Dental Hygiene*, vol. 82, No. 2, Apr. 2008.
E. Ernst "Avocado-Soybean Unsaponifiables (ASU) for Osteoarthritis—A Systematic Review" *Clinical Rheumatology* (2003) 22: 285-288.
Gondwe et al. "Effect of Persea Americana Mill (Lauraceae) "Avocado" Ethanolic Leaf Extract on Blood Glucose and Kidney Function in Streptozotocin-Induced Diabetic Rats and on Kidney Cell Lines of the Proximal and Distal Tubules" *Methods Find Exp Clin Pharmacol* 2008, 30(1): 25-35.
Rezek et al. "Insulin Dependence of Paradoxical Overeating: effect of mannoheptulose, somatostatin, and cycloheximide" 1979 the American Physiological Society E205-E211.
Walker-Bone. "Natural Remedies in the Treatment of Osteoarthritis" Drugs Aging 2003: 20(7) pp. 517-526.
Ojewolfe et al. "Cardiovascular effects of Persea Americana Mill (Lauraceae) (avocado) aqueous leaf extract in experimental animals" Cardiovasc J Afr 2007; 18: pp. 69-76.
Winnock et al. "Correlation between GABA release from rat islet B-cells and their metabolic state" Am J Physiol Endocrinol Metab 282: E937-E942 2002. 7 pages.
Brown et al. "Glucose Phosphorylation is Essential for the Turnover of Neutral Lipid and the Second Stage Assembly of Triacylglycerol-Rich ApoB-Containing Liproproteins in Primary Hepatocyte Cultures" American Heart Association, Inc. 1999, pp. 321-329.
Langhans et al. "Changes in Food Intake and Meal Patterns Following Injection of D-Mannoheptulose in Rats" Behavioral and Neural Biology 38, pp. 269-286 (1983).
Ashcroft et al. "Glucose Metabolism in Mouse Pancreatic Islets" Biochem J. (1970) 118, pp. 143-154.
Johnson et al. "Glucose-Dependent Modulation of Insulin Secretion and Intracellular Calcium Ions by GKA50, a Glucokinase Activator" Diabetes vol. 16, Jun. 2007 pp. 1694-1702.
Brai et al. "Hypoglycemic and Hypocholesterolemic Potential of Persea Americana Leaf Extracts" J Med Food 2007 pp. 356-360.
Klain et al. "Mannoheptulose and Fatty Acid Synthesis in the Rat" The Journal of Nutrition pp. 473-477, 1974.
Wood et al. "Evidence for Insulin Involvement in Arginine- and Glucose-Induced Hypercalciuria in Rat" J. Nutr. 113: pp. 1561-1567, 1983.

Scruel et al. "Interference of D-mannoheptulose with D-glucose phosphorylation, metabolism and functional effects: comparison between liver, parotid cells and pancreatic islets" Molecular and Cellular Biochemestry 187: p. 113-120, 1998.
Chan et al. "Ultra Structural and Secretory Heterogeneity of fa/fa (Zucker) Rat Islets" Molecular and Cellular Endcrinology 136 (1998) pp. 119-129.
Galllagher et al. "The Effects of Traditional Antidiabetic Plants on In-Vitro Glucose Diffusion" Nutrition Research 23 (2003) pp. 413-424.
Au et al. "Avocado soybean unsaponifiables (ASU) suppress TNF-a-lb, cox-2, iNOS gene expression and prostaglandin E2 and nitric oxide production in articular chondrocytes and monocyte/macrophages" OsteoArthritis and Cartilage (2007) 15, 18 pages.
Henrotin et al. "Pharmaceutical and nutraceutical management of canine osteoarthritis: Present and future perspectives" The Veterinary Journal 170 (2005) pp. 113-123.
Issekutz B. et al. Effects of mannaheptulise on Glucose Kinetics in Normal and Glycocorticoid Treated Dogs. Life Sciences 15(4) 635-643, 1974.
Kibenge M et al. Identification of Biochemical Defects in Pancreatic Islets of fa/fa Rats. Obesity Research 3(2) 171-178, Mar. 1995.
Board M. et al "High Km Glucose Phosphorylating (Gluokinase) Activities in a Range of Tumor Cell Lines and Inhibition of Rates of Tumor Growth by the Specific Enzyme Inhibitor Mannoheptulose". Cancer Research vol. 55, pp. 3278-3285, Aug. 1995.
Maklashina E. et al. "Is Defective Electron Transport at the Hub of Aging?" Aging Cell vol. 3, 21-27, 2004.
Publication download from http://wikipedia.org/wiki/Noni on May 4, 2009, 9 pages.
Mermelstein, Food Technology, vol. 51(10), p. 96, 1997.
Archived pages from http://web.archive.org for http://medtechnologies.com dated Jan. 2003.
Archived pages from http://web.archive.org for http://medtechnologies.com dated Feb. 2003.
Nordal et al. J. Am. Chem. Soc., 1954, vol. 76(20), pp. 5054-5055.
Breeders Choice AvoDERM product brochures http://www.breeders-choice.com/about/brochures.htm, accessed Feb. 3, 2009.
Blue Buffalo Life Protection Formula package.pdf http://www.bluebuff.com/products/dogs/lp-adult-chick.shtml Information accessed Feb. 3, 2009.
Natures Logic Natural Chicken Meal package.pdf htpp://www.natureslogic.com/products/dp_dry_chi.html Information accessed Feb. 3, 2009.
Natures Logic Natural Chicken Dinner Far Frozen package.pdf http://www.natureslogic.com/products/dp_rf_chi.html Information accessed Feb. 3, 2009.
Shimada, N. "Significance of 1, 5-Anhrdro-D-Glucitol in Diabetes Mellitus Management," Sangyo Igaku, 1994, 36 pages 448-449. (As provided by the USPTO in Office Action dated Sep. 9, 2004, for U.S. Appl. No. 09/950,052).
Robey et al. Akt, hexokinase, mTOR: Targeting cellular energy metabolism for cancer therapy, Drug Discovery Today: Disease Mechanisms, vol. 2 No. 2 2005: pp. 239-246.
Kappler-Tanudyaya et al. Combination of biotransformation and chromatography for the isolation and purification of mannoheptulose: Biotechnol J. 2007, 2: pp. 692-699.
Simon et al. Insulin and Proinsulin Secretion and Actions; Israel J. Med. Sci. vol. 8, No. 6, Jun. 1972.
Nordal et al. Isolation of mannoheptulose and identification of its phosphate in avocado leaves, Meddelelser fra Norsk Farmaceutisk Selskap (1955), 17, 207-213.
Adeyemi et al. "Analgesic and Anti-Inflammatory Effects of the Aqueous Extract Leaves of Persea Americana Mill (Lauraceae)" Fitoterapia, IDB Holding, Milan, IT, vol. 73, No. 5, Aug. 1, 2002, pp. 375-380 XP002318086.
Burger et al., "Cardiomyopathy in Ostriches (Struthio Camelus) Due to Avocado 9Persea Americana Var. Guatemalensis) Intoxication", *Journal of the South African Veterinary Association*, vol. 65 No. 2, Jun./Jul. 1994.
Byung Pal Yu et al. "Modulation of Aging Processes by Dietary Restriction", *CRC Press*, Boca Raton (1994).

(56) References Cited

OTHER PUBLICATIONS

Carranza J. et al., Database Embaes (Online) Elsevier Science Publishers, Amsterdam, NL, Nov. 2004. "Lower Quantities of Avocado as Daily Source of Monounsaturated Fats: Effect on Serum and Membrane Lipids, Endothelial Function, Platelet Aggregation and C-Reactive Protein in Patients with Metabolic Syndrome" XP002495347.
Ekor et al. "Protective Effect of the Methanolic Leaf Extract of Persea Americana (Avocado) Against Paracetamol-Induced Acute-Hepatotoxicity in Rate" International Journal of Pharmacology, Asian Network for Scientific Information, vol. 2, No. 4, Jan. 1, 2006, pp. 416-420, XP001538905.
F. B. La Forge, Absorption and Effect of Ingested Mannoheptulose, *Nutrition Reviews*, vol. 27, No. 7, p. 206, 1969.
Facchini et al. Insulin Resistance As a Predictor of Age-Related Diseases, *The Journal of Clinical Endocrinology & Metabolism*, 86(8): 3574-3578.
Francesconi et al. "5-Thio-D-Glucose: Hypothermic Responses in Mice", *Am. J. Physiology*, 239(3) R214-R218, 1980.
Guo et al. "In Vitro 2-Deoxyglucose Administration Preserves Glucose and Glutamate Transport and Mitochondrial Function in Cortical Synaptic Terminals After Exposure to Amyloid Beta-Peptide and Iron: Evidence for a Stress Response" Experimental Neurology, Academic Press, vol. 166, No. 1, Jan. 1, 2000, XP008056810 pp. 173-179.
Kalant et al. "Effect of Diet Restriction on Glucose Metabolism and Insulin Responsiveness in Aging Rats", Mechanisms of Ageing and Development, 46 (1988) 89-104.
Kealy et al. "Effects of Diet Restriction on Life Span and Age-Related Changes in Dogs", *JAVMA*, vol. 220, No. 9, May 1, 2002.
Koizumi et al. "Influences of Dietary Restriction and Age on Liver Enzyme Activities and Lipid Peroxidation in Mice" 1987 *American Institute of Nutrition*, Jul. 1986.
Kurata et al. "Structural Evaluation of Glucose Analogues on Feeding Elicitation in Rat", *Metabolism*, vol. 38, No. 1 (Jan. 1989): pp. 46-51.
Lane et al. "2-Deoxy-D-Glucose Feeding in Rats Mimics Physiologic Effects of Calorie Restriction", *Journal of Anti-Aging Medicine*, vol. 1, No. 4, 1998.
Lane et al. "Calorie Restriction in Nonhuman Primates: Implications for Age-Related Disease Risk", Journal of Anti-Aging Medicine, vol. 1, No. 4, 1998.
Lane et al. "Calorie Restriction Lowers Body Temperature in Rhesus Monkeys, Consistent With a Postulated Anti-Aging Mechanism in Rodents", *Proc. Natl. Acad. Sci.*, vol. 93 pp. 4159-4164, Apr. 1996.
Lawrence Fishbein et al. Biological Effects of Dietary Restriction, *Springer-Verlag*, 1991.
Liu et al. "'Hass' Avocado Carbohydrate Fluctuations. II. Fruit Growth and Ripening", *J. Amer. Soc. Hort. Sci.*, 124(6): 676-681. 1999.
Liu et al. "'Hass' Avocado Carbohydrate Fluctuations. I. Growth and Phenology", *J. Amer. Soc. Hort. Sci.* 124(6): 671-675. 1999.
Liu et al. "Postulated Physiological Roles of the Seven-Carbon Sugars, Mannoheptulose, and Perseitol in Avocado", *J. Amer. Soc. Hort. Sci.*, 127 (1): 108-114, 2002.
Masoro et al. "Dietary Restriction Alters Characteristics of Glucose Fuel Use", *Journal of Geronotology*, Biological Sciences 1992, vol. 47, No. 6 B202-B208.
McKay et al. "The Effect of Retarded Growth Upon the Length of Life Span and Upon the Ultimate Body Size", *J. Nutr.*, vol. 10, pp. 63-79 (1935).
Meyer et al. "Effects of D-mannoheptulose and its Hexaacetate Ester on Hormonal Secretion From the Perfused Pancreas", *International Journal of Molecular Medicine*, 6: 143-152, 2000.
Naveh et al. "Defatted Avocado Pulp Reduces Body Weight and Total Hepatic Fat But Increases Plasma Cholesterol in Male Rats Fed Diets with Cholesterol", *American Society for Nutritional Sciences*, 2002, pp. 2015-2018.
Pochlman et al. "Caloric Restriction Mimetics: Physical Activity and Body Composition Changes", *Journals of Geronotology*: Series A 2001, vol. 56A (Special Issue I): 45-54.
Ramsey et al. "Dietary Restriction and Aging in Rehesus Monkeys: The University of Wisconsin Study", *Experimental Gerontology*, 35 (2000) 1131-1149.
Rezek et al. "Glucose Antimetabolites and Hunger", 106(): 143-157, 1976.
Roth et al. "Caloric Restriction in Primates and Relevance to Humans", *Laboratory of Neurosciences, Geronotology Research Center, National Institute on Aging, National Institutes of Health, Ann NY Acad Sci* 928 p. 305, 2001.
Sener et al. "D-mannoheptulose Uptake and Its Metabolic and Secretory Effects in Human Pancreatic Islets", *International Journal of Molecular Medicine*, 6: 617-620, 2000.
Shaw et al. "High Performance Liquid Chromatographic Analysis of d-manno-heptulose, Perseitol, Glucose, and Fructose in Avocado Cultivars", J. Agric. Food Chem. 1980, 28, 379-382.
Sakata et al. "Feeding Modulation by Pentose and Hexose Analogues[1-3]", *Am. J. Clin Nutr* 1992: 55:272S-7S.
Viktora et al. "Effect of Ingested Mannopheptulose in Animals and Man", *Metabolism*, 18(2), 87-102, 1969.
Weindruch et al. "The Retardation of Aging and Disease by Dietary Restriction", Charles S. Thomas (1988).
U.S. Appl. No. 12/716,518, filed Mar. 3, 2010, Michael Griffin Hayek et al.
U.S. Appl. No. 12/716,540, filed Mar. 3, 2010, Michael Griffin Hayek et al.
U.S. Appl. No. 12/716,562, filed Mar. 3, 2010, Michael Griffin Hayek et al.
Non-Final Office Action issued in connection with U.S. Appl. No. 12/716,562, mailed Jun. 9, 2011.
Amendment in response to Non-Final Office Action mailed Jun. 9, 2011 and issued in connection with U.S. Appl. No. 12/716,562, dated Sep. 2, 2011.
Final Office Action issued in connection with U.S. Appl. No. 12/716,562, mailed Dec. 29, 2011.
Non-Final Office Action issued in connection with U.S. Appl. No. 12/638,101, mailed Jun. 10, 2011.
Amendment in response to Non-Final Office Action mailed Jun. 10, 2011 and issued in connection with U.S. Appl. No. 12/638,101, dated Sep. 2, 2011.
Supplemental amendment in response to Non-Final Office Action mailed Jun. 10, 2011 and issued in connection with U.S. Appl. No. 12/638,101, dated Sep. 29, 2011.
Final Office Action issued in connection with U.S. Appl. No. 12/638,101, mailed Dec. 30, 2011.
Non-Final Office Action issued in connection with U.S. Appl. No. 12/716,518, mailed Jun. 7, 2011.
Amendment in response to Non-Final Office Action mailed Jun. 7, 2011 and issued in connection with U.S. Appl. No. 12/716,518, dated Oct. 7, 2011.
Final Office Action issued in connection with U.S. Appl. No. 12/716,518, mailed Jan. 4, 2012.
Non-Final Office Action issued in connection with U.S. Appl. No. 12/716,540, mailed Aug. 16, 2011.
Amendment in response to Non-Final Office Action mailed Aug. 16, 2011 and issued in connection with U.S. Appl. No. 12/716,540, dated Nov. 15, 2011.
Final Office Action issued in connection with U.S. Appl. No. 12/716,540, mailed Jan. 10, 2012.

* cited by examiner

PET FOOD COMPOSITIONS

CROSS REFERENCE TO RELATED APPLICATION

This application claims priority to and is a Continuation Application of U.S. application Ser. No. 12/638,101, filed Dec. 15, 2009, which is a Continuation Application of U.S. application Ser. No. 10/842,301, filed May 10, 2004, now U.S. Pat. No. 7,666,459, issued Feb. 23, 2010, which is a Continuation-in-Part Application of U.S. application Ser. No. 09/950,052, filed Sep. 12, 2001, now abandoned.

FIELD OF THE INVENTION

The present invention is directed to pet food compositions. In certain embodiments, the pet food compositions may comprise a selected carbohydrate component, or extract of plant material selected from avocado, alfalfa, fig, primrose, and mixtures thereof.

BACKGROUND OF THE INVENTION

Studies have indicated that restriction of caloric intake by food deprivation slows down certain undesirable cellular processes in laboratory animals, many associated with aging and age-related diseases.

In particular, caloric restriction has been shown to consistently extend the life span, delay onset and slow tumor progression, and retard physiologic aging in many systems. Indeed, research spanning more than sixty years has shown that caloric restriction is a nutritional intervention that consistently extends longevity in animals. See Weindruch and Walford, "The Retardation of Aging and Disease by Dietary Restriction," Springfield, Ill.: Charles C. Thomas (1988); Yu, "Modulation of Aging Processes by Dietary Restriction," Boca Raton: CRC Press (1994); and Fishbein, "Biological Effects of Dietary Restriction," Springer, New York (1991). These effects of caloric restriction on life span and tumorigenesis have been reported numerous times since the early studies of McKay. See McKay et al., "The Effect of Retarded Growth Upon the Length of Lifespan and Upon Ultimate Body Size," J. Nutr., Vol. 10, pp. 63-79 (1935). Indeed, over the past two decades, a resurgence of interest in caloric restriction in gerontology has led to the general acceptance that this dietary manipulation slows physiologic aging in many systems. See Weindruch and Walford, "The Retardation of Aging and Disease by Dietary Restriction," Springfield, Ill.: Charles C. Thomas (1988); Yu, "Modulation of Aging Processes by Dietary Restriction," Boca Raton: CRC Press (1994); and Fishbein, "Biological Effects of Dietary Restriction," Springer, New York (1991).

Reductions in fasting glucose and insulin levels are readily measured biomarkers of caloric restriction. Calorically restricted rodents exhibit lower fasting glucose and insulin levels, and the peak glucose and insulin levels reached during a glucose challenge are reduced in those on caloric restriction. See Kalant et al., "Effect of Diet Restriction on Glucose Metabolism and Insulin Responsiveness and Aging Rats," Mech. Aging Dev., Vol. 46, pp. 89-104 (1988). It is also known that hyperinsulinemia is a risk factor associated with several such disease processes, including heart disease and diabetes (Balkau and Eschwege, Diabetes Obes. Metab. 1 (Suppl. 1): S23-31, 1999). Reduced insulin levels and body temperature are two of the most reliable indicators of this altered metabolic profile (Masoro et al., J. Gerontol. Biol. Sci. 47:B202-B208, 1992); Koizumi et al., J. Nutr. 117: 361-367, 1987; Lane et al., Proc. Nat. Acad. Sci. 93:4154-4164, 1996).

Components such as 2-deoxy-D-glucose have been described which block or inhibit certain aspects of carbohydrate metabolism and may therefore mimic the effects of caloric restriction (Rezek et al., J. Nutr. 106:143-157, 1972; U.S. Patent Application Publication No. 2002/0035071). These components exert a number of physiological effects; including reduction of body weight, decrease in plasma insulin levels, reduction of body temperature, retardation of tumor formation and growth, and elevation of circulating glucocorticoid hormone concentrations. (For a review see Roth et al., Ann. NY Acad. Sci. 928:305-315, 2001). These effects result from inhibition of carbohydrate metabolism.

However, the commercial utility of such components has been limited, particularly as practical applications had yet been identified. The present inventors herein provide compositions which may be commercially utilized and further provide processes for preparation of such compositions. In particular, it has been found that the components herein may be processed from plant matter, or otherwise provided, and then subjected to traditional pet food processing (such as, for example, extrusion or other such vigorous methods) without compromising the integrity of the component.

SUMMARY OF THE INVENTION

The present invention is directed to pet food compositions. In one embodiment, the invention is directed to pet food compositions comprising a component selected from the group consisting of 2-deoxy-D-glucose; 5-thio-D-glucose; 3-O-methylglucose; 1,5-anhydro-D-glucitol; 2,5-anhydro-D-mannitol; mannoheptulose; and mixtures thereof. In yet another embodiment, the invention is directed to pet food compositions comprising an extract of plant matter selected from the group consisting of avocado, alfalfa, fig, primrose, and mixtures thereof. The pet food compositions may be prepared by any of a variety of processes including, but not limited to, optional processes described herein.

DETAILED DESCRIPTION OF THE INVENTION

Various documents including, for example, publications and patents, are recited throughout this disclosure. All such documents are hereby incorporated by reference. The citation of any given document is not to be construed as an admission that it is prior art with respect to the present invention.

All percentages and ratios are calculated by weight unless otherwise indicated. All percentages and ratios are calculated based on the total composition unless otherwise indicated.

Referenced herein are trade names for components including various ingredients utilized in the present invention. The inventors herein do not intend to be limited by materials under a certain trade name. Equivalent materials (e.g., those obtained from a different source under a different name or reference number) to those referenced by trade name may be substituted and utilized in the descriptions herein.

In the description of the invention various embodiments or individual features are disclosed. As will be apparent to the ordinarily skilled practitioner, all combinations of such embodiments and features are possible and can result in preferred executions of the present invention.

The compositions herein may comprise, consist essentially of, or consist of any of the features or embodiments as described herein.

While various embodiments and individual features of the present invention have been illustrated and described, various other changes and modifications can be made without departing from the spirit and scope of the invention. As will also be apparent, all combinations of the embodiments and features taught in the foregoing disclosure are possible and can result in preferred executions of the invention.

As used herein, the term "pet" means a domestic dog or cat.

As used herein, the term "pet food composition" means a composition that is intended for ingestion by the pet. Pet food compositions may include, without limitation, nutritionally balanced compositions suitable for daily feed, as well as supplements (e.g., treats) which may or may not be nutritionally balanced.

Compositions of the Present Invention

The present invention is directed to pet food compositions. In one embodiment, the invention is directed to pet food compositions comprising a component selected from the group consisting of 2-deoxy-D-glucose; 5-thio-D-glucose; 3-O-methylglucose; 1,5-anhydro-D-glucitol; 2,5-anhydro-D-mannitol; mannoheptulose; and mixtures thereof. Without intending to be limited by theory, it is believed that these components are glucose anti-metabolites. See e.g., U.S. Patent Application Publication No. 2002/0035071. In another embodiment, the components may be present in the recited compositions by virtue of a component of plant matter such as avocado, or other enriched source of mannoheptulose such as alfalfa, fig, or primrose.

The inclusion of glucose anti-metabolites as part of the pet food compositions herein are useful, for example, to alter utilization of glucose or other energy sources and to mimic metabolic effects of caloric restriction. Without intending to be limited by theory, the present use of glucose anti-metabolites to alter glucose metabolism serves to lower the metabolic rate through inhibition of glucose as an energy source on the cellular level. Judicious use of components that block the normal metabolism of cellular glucose can result in changes in physiological function that are similar to those arising from caloric restriction. Caloric restriction has been consistently shown to extend longevity in animals. See Weindruch and Walford, "The Retardation of Aging and Disease by Dietary Restriction," Springfield, Ill.: Charles C. Thomas (1988); Yu, "Modulation of Aging Processes by Dietary Restriction," Boca Raton: CRC Press (1994); and Fishbein, "Biological Effects of Dietary Restriction," Springer, New York (1991).

Components which are useful herein include 2-deoxy-D-glucose, 5-thio-D-glucose, 3-O-methylglucose, anhydrosugars including 1,5-anhydro-D-glucitol, 2,5-anhydro-D-glucitol, and 2,5-anhydro-D-mannitol, and mannoheptulose. Mannoheptulose is preferred for use herein. Advantageously, mannoheptulose or any other component may be present in the recited compositions as a component of plant matter such as avocado, or other enriched source of mannoheptulose such as alfalfa, fig, or primrose. The plant matter may include the fruit, seed (or pit), branches, leaves, or any other portion of the relevant plant or combination thereof.

Avocado (also commonly referred to as alligator pear, aguacate, or palta) contains unusually enriched sources of mannoheptulose, as well as related sugars and other carbohydrates. Avocado is a sub-tropical evergreen tree fruit, growing most successfully in areas of California, Florida, Hawaii, Guatemala, Mexico, the West Indies, South Africa, and Asia.

Species of avocado include, for example, *Persea Americana* and *Persea nubigena*, including all cultivars within these illustrative species. Cultivars may include 'Anaheim,' 'Bacon,' 'Creamhart,' 'Duke,' 'Fuerte,' 'Ganter,' 'Gwen,' 'Hass,' 'Jim,' 'Lula,' 'Lyon,' 'Mexicola,' 'Mexicola Grande,' 'Murrieta Green,' 'Nabal,' 'Pinkerton,' 'Queen,' 'Puebla,' 'Reed,' 'Rincon,' 'Ryan,' 'Spinks,' 'Topa Topa,' 'Whitsell,' 'Wurtz,' and 'Zutano.' The fruit of the avocado is particularly preferred for use herein, which may contain the pit or wherein the pit is removed or at least partially removed. Fruit from *Persea Americana* is particularly preferred for use herein, as well as fruit from cultivars which produce larger fruits (e.g., about 12 ounces or more when the fruit is mature), such as Anaheim, Creamhart, Fuerte, Hass, Lula, Lyon, Murrieta Green, Nabal, Queen, Puebla, Reed, Ryan, and Spinks.

Plant matter from alfalfa, fig, or primrose are also reported to provide relatively high levels of mannoheptulose. Alfalfa is also referred to as *Medicago sativa*. Fig, or *Ficus carica* (including Cluster fig or Sycamore fig, for example) may also be used, as well as primrose or *Primula officinalis*.

The present inventors have discovered that particular levels of a component selected from 2-deoxy-D-glucose; 5-thio-D-glucose; 3-O-methylglucose; 1,5-anhydro-D-glucitol; 2,5-anhydro-D-mannitol; mannoheptulose; and mixtures thereof, are useful herein. In particular, it has been found that relatively low levels, as well as relatively high doses of the component, while useful, may provide less than optimal efficacy for desired purposes. In particular, an optimal dose to the pet, on a daily basis, has been surprisingly discovered to be from about 1 mg/kg to about 15 mg/kg, more advantageously from about 2 mg/kg to about 10 mg/kg, even more advantageously from about 2 mg/kg to about 5 mg/kg, wherein (as will be commonly understood in the art) the "mg" refers to level of the component and the "kg" refers to kilograms of the pet. In certain embodiments, this may translate to pet food compositions comprising less than about 5%, or less than about 2%, or from about 0.0001% to about 0.5% of the component, all by weight of the composition. The level of component may be determined by one of ordinary skill in the art based on a variety of factors, for example, the form of the pet food composition (e.g., whether a dry composition, semi-moist composition, wet composition, or supplement, or any other form or mixture thereof). The ordinarily skilled artisan will be able to utilize the preferred optimal doses, and use these to determine the optimal level of component within a given pet food composition.

Similarly, wherein an extract of plant matter is utilized in the pet food compositions herein, optimal levels of extract will of course be dependent upon level of efficacious component within such extract. Optimal extracts have been found herein which comprise from about 1% to about 99% of the component, alternatively from about 5% to about 75% of the component, alternatively from about 10% to about 50% of the component, all by weight of the extract.

Pet food compositions will advantageously include foods intended to supply necessary dietary requirements, as well as treats (e.g., dog biscuits) or other food supplements. Optionally, the composition herein may be a pet food composition such as a dry composition (for example, kibble), semi-moist composition, wet composition, or any mixture thereof. Alternatively or additionally, the composition is a supplement, such as a gravy, drinking water, yogurt, powder, suspension, chew, treat (e.g., biscuits) or any other delivery form.

Moreover, in one embodiment the pet food composition is nutritionally balanced. As used herein, the term "nutritionally balanced," with reference to the pet food composition, means that the composition has known required nutrients to sustain life in proper amounts and proportion based on recommendations of recognized authorities in the field of pet nutrition.

The compositions used herein may optionally comprise one or more further components. Other components are beneficial for inclusion in the compositions used herein, but are optional for purposes of the invention. In one embodiment, the food compositions may comprise, on a dry matter basis, from about 10% to about 90% crude protein, alternatively from about 20% to about 50% crude protein, alternatively from about 20% to about 40% crude protein, by weight of the food composition, or alternatively from about 20% to about 35% crude protein, by weight of the composition. The crude protein material may comprise vegetable proteins such as soybean, cottonseed, and peanut, or animal proteins such as casein, albumin, and meat protein. Non-limiting examples of meat protein useful herein include a protein source selected from the group consisting of beef, pork, lamb, poultry, fish, vegetable, and mixtures thereof.

Furthermore, the compositions may comprise, on a dry matter basis, from about 5% to about 40% fat, alternatively from about 10% to about 35% fat, by weight of the food composition.

The compositions of the present invention may further comprise a source of carbohydrate. Grains or cereals such as rice, corn, milo, sorghum, barley, wheat, and the like are illustrative sources.

The compositions may also contain other materials such as dried whey and other dairy by products.

Optional Processes for Preparing the Compositions of the Present Invention

The pet food compositions may be prepared by any of a variety of processes including, but not limited to, optional processes described herein. Disclosed herein are optional processes for preparing the present inventive compositions. The ordinarily skilled artisan will understand, however, that the compositions are not limited by the following described processes.

A process for preparing the present compositions may comprise:
  (a) providing plant matter selected from the group consisting of avocado, alfalfa, fig, primrose, and mixtures thereof;
  (b) combining the plant matter with an aqueous solution and optionally with an enzyme, further optionally with heating, to provide a digested plant mixture;
  (c) optionally separating any fractions present in the digested plant mixture, if any, to provide a carbohydrate extract;
  (d) concentrating the digested plant mixture to enhance the concentration of carbohydrate therein; and
  (e) combining the digested plant mixture with one or more pet food composition components.

The plant matter provided in the optional processes may be avocado, alfalfa, fig, primrose, and mixtures thereof. The plant matter may be any portion or whole of the plant, such as the leaves, fruit, seed or pit, particularly at least those portions of the plant that contain elevated levels of carbohydrate such as 2-deoxy-D-glucose, 5-thio-D-glucose, 3-O-methylglucose, 1,5-anhydro-D-glucitol, 2,5-anhydro-D-mannitol, or mannoheptulose. In one optional process herein, the avocado is provided, and the process may commence with whole avocado fruit, including the pit or devoid (or partially devoid) of the pit. If the plant matter which is provided contains a pit, or partial pit, the pit or portion thereof may be optionally removed prior to further processing. Alfalfa, fig, or primrose may be similarly processed.

In one optional process, production of a digested plant mixture comprises combination of the plant matter with an aqueous solution, such as water, to assist with maceration of the plant into manageable constituents. Optionally but preferably, an enzyme having cellulose or pectin activity, or any combination thereof (such as a cellulase, hemicellulase, or pectinase) is included to assist with such maceration, including to assist with dissolution and release of carbohydrates via cell wall disruption. The utility of such an enzymatic treatment may be enhanced through heating during such maceration, such as from above ambient temperature to about 120° C., or to about 100° C., or from about 60° C. to about 120° C., or from about 60° C. to about 100° C. Agitation is further preferably utilized, typically for up to about 24 hours, but dependent upon the batch under processing. In one embodiment, the pH is controlled such to preserve enzyme activity, often in the range of pH from about 4 to about 6, preferably in the range of pH from about 5 to about 6. As such, depending upon such factors as ripeness of plant matter, quality of process aqueous solution (such as water added for process, for example), and the like, amounts of acid or base may be desirable as will be appreciated by one of ordinary skill in the art.

Optionally, to assist with deactivation of the enzymes present, heating may be increased at the time of, or after, initial heating and agitation to form the digested plant mixture. Water is optionally heated to processing temperatures prior to the addition of the plant matter. Heat may be applied by a jacketed tank where low pressure steam is utilized.

The digested plant mixture may result in fractions which may be separated in accordance with common techniques. For example, fractions present in the digested plant mixture may be separated by filtration to provide the carbohydrate extract as the resulting filtrate, with the filter cake being discarded. Other methods may include, but not be limited to, gravimetric, centrifugal, other filtrations, or combinations thereof.

The carbohydrate extract may then be concentrated, optionally utilizing at least one concentration method selected from the group consisting of heating, vacuum drying, evaporation, refractance window drying, freeze drying, spray drying, any other useful technique, or any combination of the foregoing. In one embodiment, at least one technique such as refractance window drying is used.

Once concentrated, the carbohydrate extract may be utilized in the pet food compositions of the present invention. In one embodiment herein, the present processes result in preferred yields of mannoheptulose or other carbohydrate, or carbohydrate extract, based on the starting mass of the plant matter (e.g., avocado). In one embodiment, the yield of mannoheptulose present in the carbohydrate extract subsequent to concentration is less than about 20%, or from about 0.1% to about 10%, or from about 1% to about 7%, based on the starting mass of the plant matter. In another embodiment, the yield of the carbohydrate extract subsequent to concentration is less than about 30%, or from about 5% to about 25%, or from about 8% to about 20%, based on the starting mass of the plant matter. Of course, even higher yields may be desirable, and lower yields may also be acceptable.

EXAMPLES

The following examples are provided to illustrate the invention and are not intended to limit the scope thereof in any manner.

Example 1

Avocado extract containing enhanced levels of mannoheptulose is prepared in accordance with the following optional process, and utilized in pet food compositions of the present invention:

Whole avocado fruit (about 900 kilograms) is provided. The fruit is split and the pits are removed, either partially or wholly, providing about 225 kilograms of pitted avocado halves. The raw avocado is charged to a disintegrator, whereupon some agitation, water (about 3000 kilograms) and CELLUBRIX (commercially available from Novozymes A/S) (about 1 liter) is further charged. The mixture is further agitated and concurrently heated to about 66° C. Upon completion of the charge, further CELLUBRIX (about 1 liter) is added, and the entire mixture is held under agitation for about 12 hours at a controlled pH of about 5.5. The temperature is then further increased to about 80° C. and then held for at least about 2 hours. The resulting digested plant mixture is then filtered at 80° C. to provide the carbohydrate extract as the filtrate. The carbohydrate extract is then evaporated in a simplified recirculation system at 80° C., under vacuum, to a provide the carbohydrate extract having about from about 10% to about 20% solids and a pH of about 5.5. The extract is then further concentrated using a refractance window dryer to provide about 100 kilograms of the extract as a crystalline or powder (a yield of about 11% carbohydrate extract, based on the starting mass of the whole avocado fruit, which is analyzed as a yield of about 4.5% mannoheptulose, based on the starting mass of the whole avocado fruit). The extract may be used in the pet food compositions of the present invention.

Example 2

Two kibble compositions having the following components at the approximate indicated amounts are prepared using methods which are standard in the art, including extrusion, and are fed to cats as a daily feed:

| Component | Example 1A (Component Amount indicated as Wt %) | Example 1B (Component Amount indicated as Wt %) |
|---|---|---|
| Extract of Avocado | 0.02 | 0.01 |
| Chicken, Chicken By-product Meal, and Fish Meal | 44 | 47 |
| Chicken Fat | 8 | 6 |
| Beet Pulp | 2 | 3 |
| Salts | 2.5 | 2 |
| Vitamins and Minerals** | 1 | 1 |
| Minors | 3.5 | 4 |
| Grains (corn, sorghum) | Remainder | Remainder |

*Avocado may be substituted with other plant matter having enhanced mannoheptulose content.
**Vitamins and Minerals include: Vitamin E, beta-carotene and Vitamin A, Zinc Oxide, Ascorbic Acid, Manganese Sulfate, Copper Sulfate, Manganous Oxide, Calcium Pantothenate, Biotin, Vitamin $B_{12}$, Vitamin $B_1$, Niacin, Vitamin $B_2$, Vitamin $B_6$, Vitamin $D_3$, Folic Acid.

Example 3

A beef-flavor gravy composition is prepared by combining the following components in a conventional manner:

| Component | Wt % |
|---|---|
| Mannoheptulose* | 0.14 |
| Chicken Fat | 3.0 |
| Spray-Dried Beef Particles and Broth | 3.0 |
| Xanthan Gum | 0.5 |
| Flax Seed | 0.2 |
| Vegetables | 0.2 |
| Vitamins** | 0.06 |
| Minerals | 0.04 |
| Phosphoric Acid | 0.95 |
| Beef Flavor | 0.1 |
| Water | Remainder |

*Mannoheptulose may be substituted with another component as described herein.
**Vitamins and Minerals include: Vitamin E, beta-carotene and Vitamin A, Zinc Oxide, Ascorbic Acid, Manganese Sulfate, Copper Sulfate, Manganous Oxide, Calcium Pantothenate, Biotin, Vitamin $B_{12}$, Vitamin $B_1$, Niacin, Vitamin $B_2$, Vitamin $B_6$, Vitamin $D_3$, Folic Acid.

One fluid ounce of the gravy composition is admixed with one-half cup of standard dog kibble diet daily prior to feeding to a dog. Amounts of the gravy composition are determined as desired by the guardian of the dog.

What is claimed is:

1. A pet food composition comprising a component selected from the group consisting of 2-deoxy-D-glucose; 5-thio-D-glucose; 3-O-methylglucose; 1,5-anhydro-D-glucitol; 2,5-anhydro-D-mannitol; mannoheptulose; and mixtures thereof in an amount less than about 5% by weight of the composition.

2. The pet food composition of claim 1, further comprising a source of carbohydrates, proteins, fats, vitamins, beta carotene, or minerals, and mixtures thereof.

3. The pet food composition of claim 1, wherein the component is present in an amount from about 0.0001% to less than about 5% by weight of the composition.

4. The pet food composition of claim 1, wherein the component is present in an amount less than about 2% by weight of the composition.

5. The pet food composition of claim 1, wherein the component is mannoheptulose.

6. The pet food composition of claim 3, further comprising vitamin E and beta carotene.

7. The pet food composition of claim 1, wherein the pet food composition is nutritionally balanced.

8. The pet food composition of claim 1, wherein the pet food is not nutritionally balanced.

9. The pet food composition of claim 1, further comprising a nutritionally balanced pet food composition.

10. The pet food composition of claim 1, further comprising an extract of plant matter selected from the group consisting of avocado, alfalfa, fig, primrose, and mixtures thereof.

11. A pet food composition comprising:
a) a pet food supplement comprising a component selected from the group consisting of 2-deoxy-D-glucose; 5-thio-D-glucose; 3-O-methylglucose; 1,5-anhydro-D-glucitol; 2,5-anhydro-D-mannitol; mannoheptulose; and mixtures thereof; and
b) a nutritionally balanced pet food composition.

12. A method comprising providing an animal the pet food composition according to claim 1.

13. The method of claim 12, wherein the pet food composition further comprises a source of carbohydrates, proteins, fats, vitamins, beta carotene, or minerals, and mixtures thereof.

14. The method of claim 12, wherein the component is present in an amount from about 0.0001% to less than about 5% by weight of the composition.

15. The method of claim 12, wherein the component is present in an amount less than about 2% by weight of the composition.

16. The method of claim 12, wherein the component is mannoheptulose.

17. The method of claim 12, wherein the pet food composition further comprises vitamin E and beta carotene.

18. The method of claim 12, wherein the pet food composition is nutritionally balanced.

19. The method of claim 12, wherein the pet food is not nutritionally balanced.

20. The method of claim 12, further comprising providing the animal a nutritionally balanced pet food composition.

21. The method of claim 12, wherein the pet food composition further comprises an extract of plant matter comprising mannoheptulose.

22. A method comprising providing an animal the pet food composition according to claim 11.

23. The method of claim 22, wherein the component is present in an amount less than about 5% by weight of the composition.

* * * * *